(12) United States Patent
Jensen et al.

(10) Patent No.: US 11,877,205 B2
(45) Date of Patent: Jan. 16, 2024

(54) METHOD FOR DATA RETRIEVING AND DISTRIBUTING USING GEOFENCE BASED TRIGGERS

(71) Applicant: project44 A/S, Nørresundby (DK)

(72) Inventors: Lars Mohr Jensen, Skørping (DK); Per Engberg, Aalborg (DK); Jesper Bille Bennike, Frederiksberg (DK)

(73) Assignee: project44 A/S, Nørresundby (DK)

( * ) Notice: Subject to any disclaimer, the term of this patent is extended or adjusted under 35 U.S.C. 154(b) by 0 days.

(21) Appl. No.: 17/809,529

(22) Filed: Jun. 28, 2022

(65) Prior Publication Data
US 2023/0048714 A1  Feb. 16, 2023

Related U.S. Application Data

(62) Division of application No. 16/499,182, filed as application No. PCT/DK2018/050057 on Mar. 27, 2018, now Pat. No. 11,405,745.

(30) Foreign Application Priority Data

Mar. 31, 2017  (DK) .............................. PA2017 70238

(51) Int. Cl.
*H04W 4/021*  (2018.01)
*H04W 4/44*  (2018.01)
(Continued)

(52) U.S. Cl.
CPC ............ *H04W 4/021* (2013.01); *G06Q 10/08* (2013.01); *G07C 5/008* (2013.01); *H04W 4/025* (2013.01); *H04W 4/029* (2018.02); *H04W 4/44* (2018.02)

(58) Field of Classification Search
CPC .... H04W 4/021; G06Q 20/3224; G06Q 50/28
See application file for complete search history.

(56) References Cited

U.S. PATENT DOCUMENTS 8,169,342 B1  5/2012  Barbeau et al.
9,135,826 B2  9/2015  Malhotra
(Continued)

FOREIGN PATENT DOCUMENTS

EP  2900000 A1  7/2015
EP  2958348 A1  12/2015
(Continued)

OTHER PUBLICATIONS

Bösch, Christoph "An Efficient Privacy-Preserving Outsourced Geofencing Service Using Bloom Filter" Published in: 2018 IEEE Vehicular Networking Conference (VNC) Jan. 2019 (Year: 2019).
(Continued)

*Primary Examiner* — William D Cumming
(74) *Attorney, Agent, or Firm* — Knobbe Martens Olson & Bear LLP

(57) ABSTRACT

A method for retrieving data, such as telematics data, from a vehicle, to which a tour is assigned, and forwarding at least a subset of those data to an observer. The method comprises the steps of determining a location of the vehicle. Providing two or more concentric geofence, the concentric geofences comprises an outer geofence and an inner geofence. Define a start concentric geofence with a pick-up location inside an inner geofence and an end geofence with a delivery location inside an inner geofence. After a tour is assigned to the vehicle, retrieve at a server the data from said vehicle. Forwarding from the server a subset of the data to the observer, where the subset is defined as data retrieved from the vehicle being within a geographical region defined as where the vehicle enters an outer geofence of said start concentric geofence and exit of an inner geofence of an end concentric geofence.

27 Claims, 10 Drawing Sheets

(51) Int. Cl.
*H04W 4/029* (2018.01)
*H04W 4/02* (2018.01)
*G07C 5/00* (2006.01)
*G06Q 10/08* (2023.01)

(56) References Cited

U.S. PATENT DOCUMENTS

| | | | |
|---|---|---|---|
| 9,408,042 | B2 | 8/2016 | Stubbs |
| 9,688,288 | B1 | 6/2017 | Lathrop |
| 9,928,744 | B1 | 3/2018 | Tannenbaum |
| 10,066,952 | B2 | 9/2018 | Park |
| 10,117,067 | B2 | 10/2018 | Stubbs |
| 10,300,930 | B2 | 5/2019 | Lathrop |
| 10,406,446 | B2 | 9/2019 | Amaitis |
| 10,589,713 | B2 | 3/2020 | Boran |
| 10,706,647 | B2 | 7/2020 | Oliver |
| 10,922,777 | B2 * | 2/2021 | Kuersten ............... G06Q 50/28 |
| 2006/0145837 | A1 | 7/2006 | Horton et al. |
| 2008/0140571 | A1 | 6/2008 | Inbarajan et al. |
| 2011/0238300 | A1 | 9/2011 | Schenken |
| 2013/0009977 | A1 | 1/2013 | Ström |
| 2013/0099977 | A1 | 4/2013 | Sheshadri |
| 2013/0249713 | A1 | 9/2013 | Adelson |
| 2013/0268353 | A1 | 10/2013 | Zeto, III |
| 2014/0121958 | A1 | 5/2014 | Schenken et al. |
| 2014/0214264 | A1 | 7/2014 | Campagna et al. |
| 2015/0023502 | A1 | 1/2015 | Li |
| 2015/0148060 | A1 | 5/2015 | Parab |
| 2015/0148061 | A1 | 5/2015 | Koukoumidis et al. |
| 2015/0355334 | A1 | 12/2015 | Stubbs |
| 2016/0050542 | A1 | 2/2016 | Stubbs |
| 2016/0350986 | A1 | 12/2016 | Oliver |
| 2017/0045367 | A1 | 2/2017 | Park |
| 2017/0150308 | A1 | 5/2017 | Jones |
| 2017/0230792 | A1 | 8/2017 | Shaik |
| 2017/0259832 | A1 | 9/2017 | Lathrop |
| 2017/0280283 | A1 | 9/2017 | Venkatraman et al. |
| 2018/0350144 | A1 * | 12/2018 | Rathod ............... G06Q 20/3224 |
| 2020/0107150 | A1 * | 4/2020 | Jensen ................ G07B 15/00 |

FOREIGN PATENT DOCUMENTS

| | | |
|---|---|---|
| WO | WO 2011/119538 A1 | 9/2011 |
| WO | WO-2018177491 A1 * | 10/2018 ............. G06Q 10/04 |

OTHER PUBLICATIONS

Garzon, Sandro Rodriguez et al., "Infrastructure-Assisted Geofencing: Proactive Location-Based Services with Thin Mobile Clients and Smart Servers"; Published in: 2015 3rd IEEE International Conference on Mobile Cloud Computing, Services, and Engineering Apr. 2015 (Year: 2015).

International Search Report for PCT/DK2018/050057 dated Jun. 6, 2018.

* cited by examiner

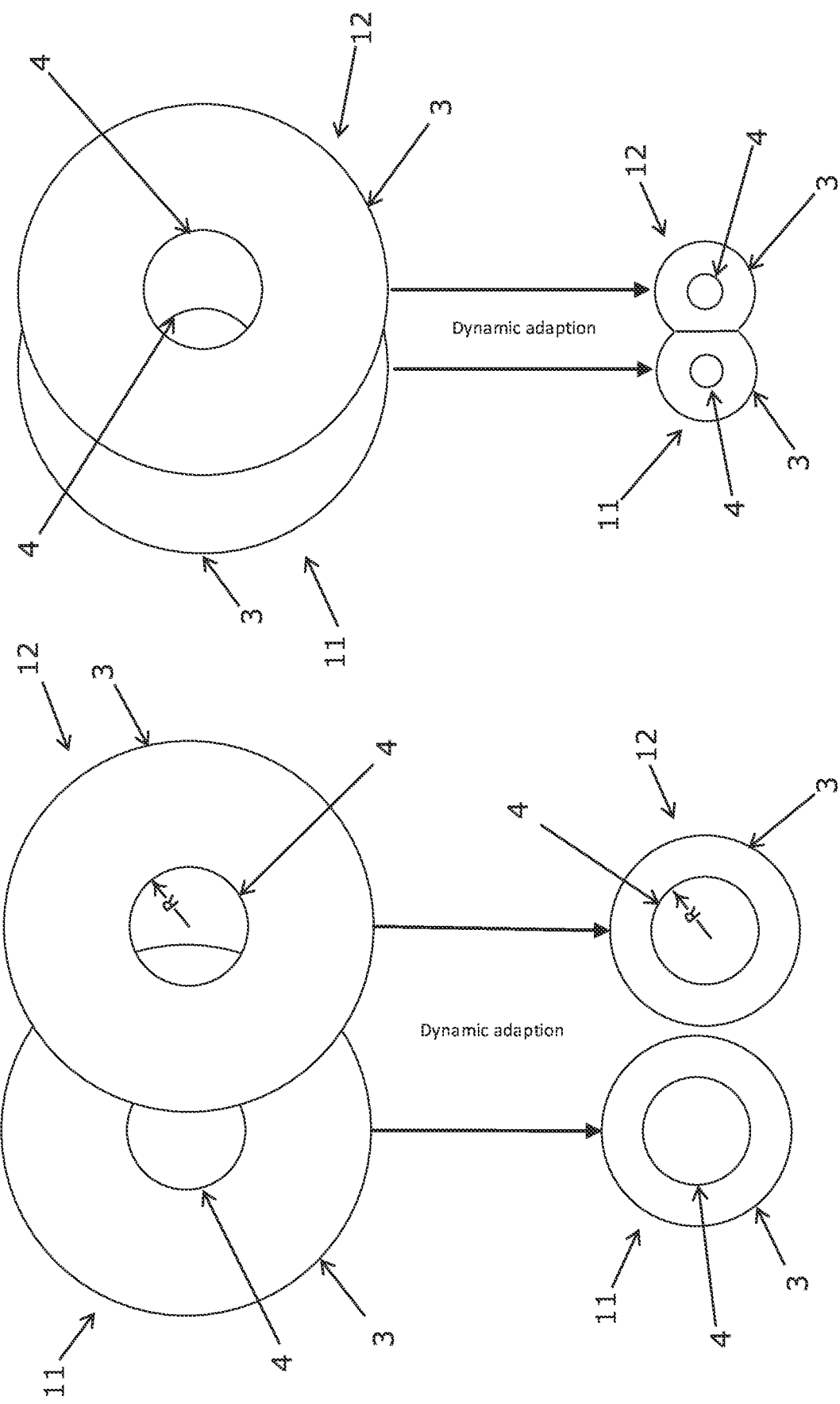

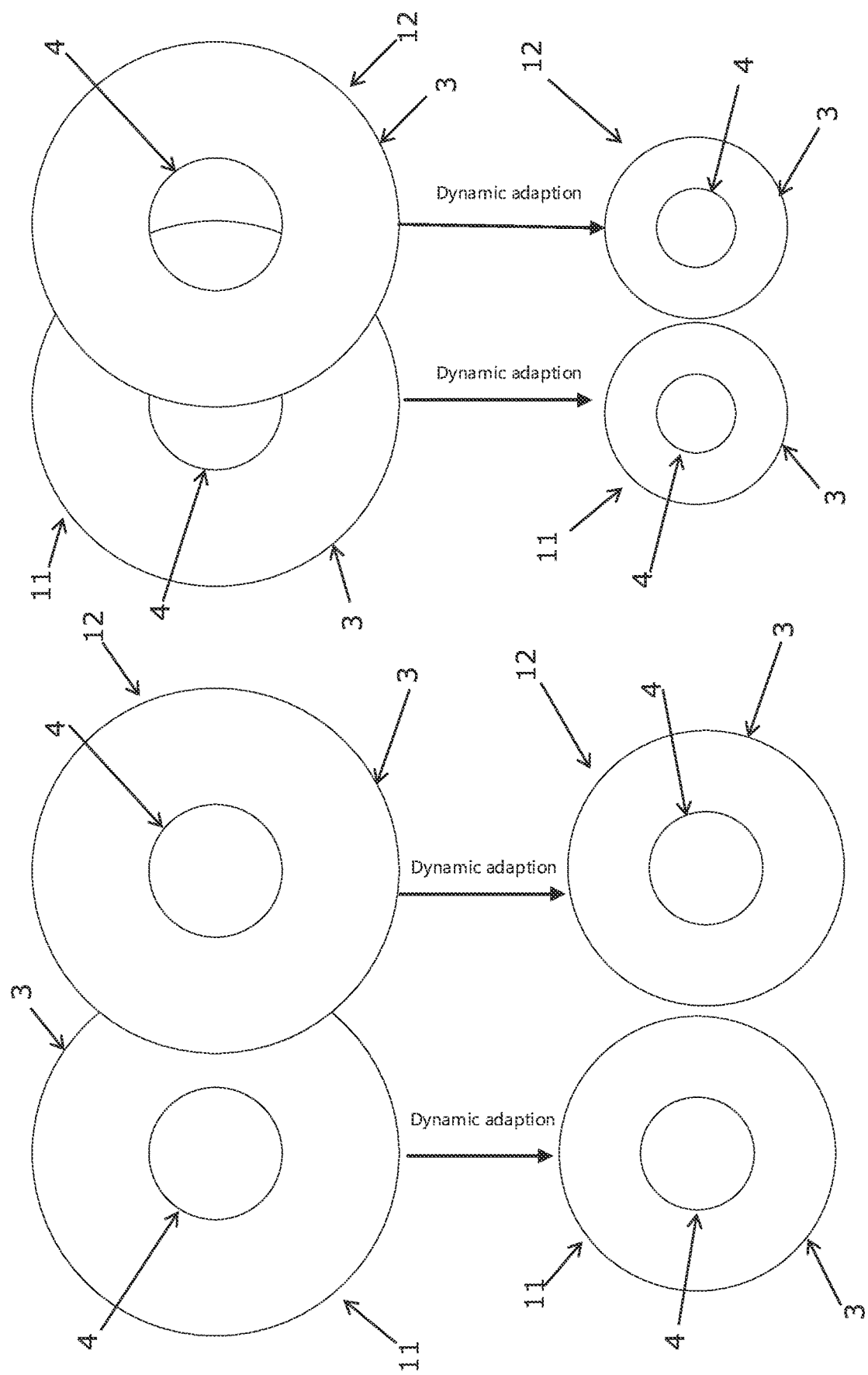

METHOD FOR DATA RETRIEVING AND DISTRIBUTING USING GEOFENCE BASED TRIGGERS

CROSS REFERENCE TO RELATED APPLICATIONS

This application is a Divisional of and claims the benefit of priority to U.S. patent application Ser. No. 16/499,182, filed on Sep. 27, 2019, which is a U.S. National Phase Application of PCT International Application No. PCT/DK2018/050057, filed on Mar. 27, 2018, designating the United States of America and published in the English language, which is an International Application of and claims the benefit of priority to Danish Patent Application No. PA 2017 70238, filed on Mar. 31, 2017. The disclosures of the above-referenced applications are hereby expressly incorporated by reference in their entireties.

FIELD OF THE INVENTION

The present invention relates to a method for retrieving data, such as telematics data, from a vehicle, to which a tour is assigned, and forwarding at most a subset of those data to an observer.

BACKGROUND OF THE INVENTION

The present invention relates to a monitoring of the vehicle position, logistics and data handling systems.

Monitoring of vehicles is an important aspect in logistics management and surveillance. Various methods and different data collection systems are used to collect data associated with monitoring of vehicles. The collected data can be transmitted to a central monitoring system, which monitors a vehicle, based on the reported data. The monitoring of the vehicles and the associated data transmission is achieved by use of data transmission systems. The data is retrieved by the central monitoring system and forwarded to third parties. Collection of logistic data is an essential factor for companies to better manage the large amount of data coming from many different systems belonging to different data owners. Retrieving, processing and forwarding of data is executed via. geofence-based triggers.

By using geofence based triggers for data distribution to third parties (in the following referred to as "observers") can be turned off and on at desirable times. Geofences is established via factors such as: pick-up location, delivery location and time windows (scheduled pickup and delivery).

The advantages and disadvantages of using large and/or small geofences is a recurring problem.

OBJECT OF THE INVENTION

An object of the present invention is to provide an alternative to the prior art.

It is in particular an object of the present invention to provide a method for retrieving data, such as telematics data, from a vehicle, to which a tour is assigned, and forwarding at least a subset of those data to an observer. The tour definition being the data distribution contract between the sovereign data owner and the observer.

SUMMARY OF THE INVENTION

The invention relates, in as first aspect, to a method for retrieving data, such as telematics data, from a vehicle, to which a tour is assigned, and forwarding at least a subset of those data to an observer, the method comprising the steps of:

determining a location of the vehicle, providing two or more concentric geofences, the concentric geofences comprises an outer geofence and an inner geofence, define a start concentric geofence with a pick-up location inside an inner geofence and an end geofence with a delivery location inside an inner geofence;

after a tour is assigned to the vehicle, retrieve at a server the data from the vehicle, forwarding from the server a subset of the data to the observer, where the subset is defined as data retrieved from the vehicle being within a geographical region defined as where the vehicle enters an outer geofence of the start concentric geofence and exit of an inner geofence of an end concentric geofence.

In some embodiments, the method may comprise retrieving at the server, data from the vehicle during a wider timeframe than after a tour is assigned to said vehicle.

The method may further comprise the step of determining whether the vehicle has exit an inner geofence of the end concentric geofence, and in confirmative case stop forwarding the subset of the data to the observer.

The method may further comprise the step of stop retrieving the data when the tour is completed.

The method may further comprise the step of determining whether the vehicle has entered and exited the inner geofences of the concentric geofences.

The method may further comprise the step of processing the subset of data, when the vehicle being within a geographical region defined as where the vehicle enters an outer geofence of the start concentric geofence and exit of an inner geofence of an end concentric geofence.

The data is preferably telematics data, the telematics data being retrieved via one or more data retrieving devices arranged on the vehicle.

The method may further comprise the step of providing two concentric geofences, a start concentric geofence and an end concentric geofence.

Preferably, no data is retrieved when no tour is assigned to the vehicle.

The method may further comprise the step of determining whether the vehicle has entered and exited the inner geofence of the end concentric geofences, and in confirmative case assign the tour to be completed.

The method may further comprise the step of determining whether the vehicle has entered and exited the outer geofence of the start concentric geofence and whether the vehicle has entered and exited the inner geofence of the end concentric geofences, and in confirmative case assign the tour to be completed.

The method may further comprise the step of determining whether the vehicle has entered and exited the inner geofence of the start concentric geofence and whether the vehicle has entered and exited the outer geofence of the end concentric geofences and in confirmative case assign the tour to be completed.

The method may further comprise the step of determining whether the vehicle has entered and exited the inner geofence of start concentric geofence and whether the vehicle has entered and exited the inner geofence of end concentric geofences, and in confirmative case assign the tour to be completed.

The method may further comprise the step of determining whether the vehicle has not entered and exited the outer geofence of the start concentric geofence and in confirmative case not assign the tour to be completed.

The method may further comprise the step of determining whether the vehicle has not entered and exited the outer geofence of the end concentric geofence and in confirmative case not assign the tour to be completed.

The method may further comprise the step of determining whether the vehicle has not entered and exited the outer geofence of the start concentric geofence and in confirmative case change size of the end concentric geofence and/or the start concentric geofence.

Preferably, the inner geofence has a radius smaller than said outer geofence.

Preferably, the outer geofence has a radius from 0-100 km, such as 0-50 km, preferably 0-25 km.

Preferably, the inner geofence has a radius from 0-20 km, such as 0-10 km, preferably 0-1 km.

Preferably, a shape of the geofences is selected from the group comprising: circle, polygon, such as polygenic.

The method may further comprise the step of determining whether the inner geofence of the start concentric geofence and the outer geofence of the end concentric geofence overlap, and in confirmative case initiate a dynamic adaption of the shape of the start concentric geofence and/or the end concentric geofence.

The method may further comprise the step of determining whether said inner geofence of the start concentric geofence and the inner geofence of the end concentric geofence overlap, and in confirmative case initiate a dynamic adaption of the shape of the start concentric geofence and/or the end concentric geofence.

The method may further comprise the step of determining whether the outer geofence of the start concentric geofence and the outer geofence of the end concentric geofence overlap, and in confirmative case initiate a dynamic adaption of the shape of the start concentric geofence and/or the end concentric geofence.

The method may further comprise the step of determining whether the outer geofence of the start concentric geofence and the inner geofence of the end concentric geofence overlap, and in confirmative case initiate a dynamic adaption of the shape of the start concentric geofence and/or the end concentric geofence.

A dynamic adaption, when applied, may typically be carried out in an initial set-up step.

Preferably, the boundary of one or more of the geofences conforms to course of roads within the tour.

The method may further comprise the step of determining whether entering and exiting geofences occurs during a predetermined period in time and only forwarding subset of data if this occurrence is present during the predetermined period in time.

Preferably, the inner geofence of the end concentric geofence may comprise a sub-geofence including the delivery location, defining an approaching region and an arriving region, the method may further comprise generating:
- a signal indicating that a vehicle is approaching when the vehicle enters the approaching region;
- a signal indicating that a vehicle has arrived when the vehicle enters the arrival region;
- a signal indicating that the vehicle has departed when the vehicle leaves the arrival region.

The approaching and/or the arriving region may preferably be a shape selected from the group comprising: circle, polygon, such as polygenic.

The present invention solves the data sovereignty challenge in logistic IoT (Internet of Things), and in geospatial data sharing in general, by a strict method associating telematics or other geospatial data with a specific tour, where tour is a combination of location, time, and vehicle.

In another aspect, the present invention relates to a device, configured to perform the method according to the present invention.

In the present context a number of terms are used in a manner being ordinary to the skilled person. Some of these terms are detailed below:

Observer is preferably meant to denote a third party, which data retrieved by the vehicle, is forwarded to.

The aspects of the present invention may each be combined with any of the other aspects. These and other aspects of the invention will be apparent from and elucidated with reference to the embodiments described hereinafter.

BRIEF DESCRIPTION OF THE FIGURES

The present invention and in particular preferred embodiments thereof will now be disclosed in greater details with reference to the accompanying figures. The figures show ways of implementing the present invention and are not to be construed as being limiting to other possible embodiments falling within the scope of the attached claim set.

FIG. 7a-d is a schematically view of the dynamic adaptation of geofences, in case initial geofences overlap.

DETAILED DESCRIPTION OF AN EMBODIMENT

Figure 1:
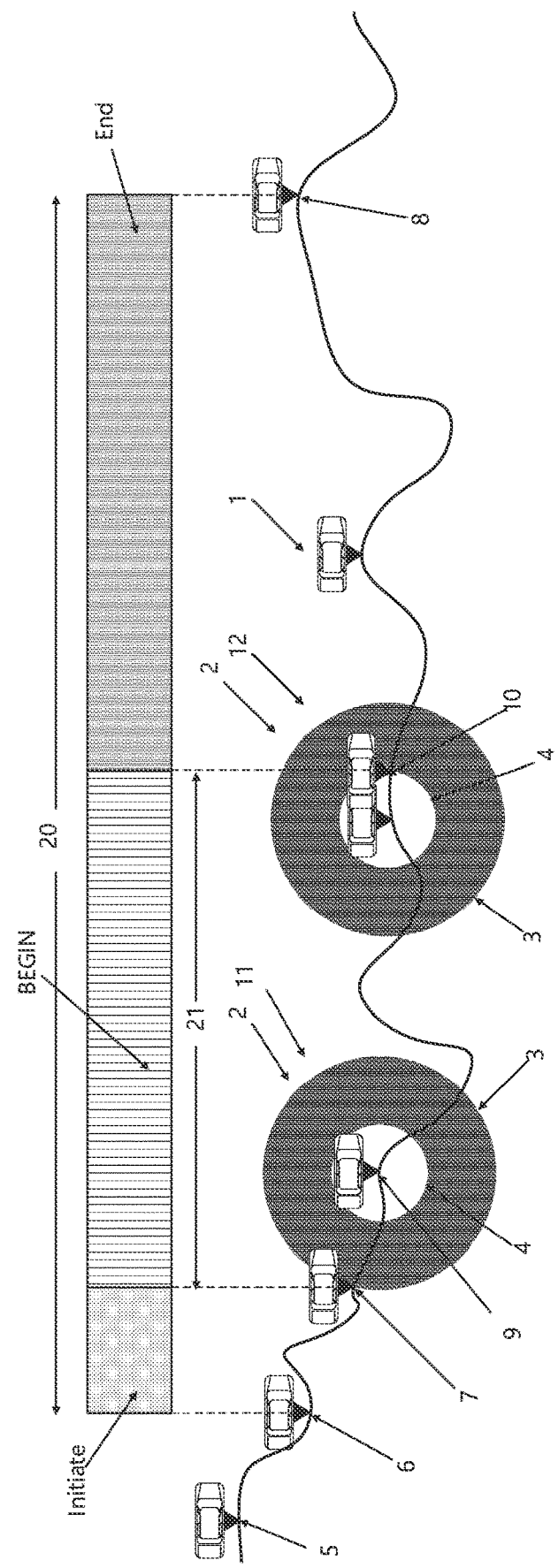
FIG. 1 is a schematically view of a data flow according to a first embodiment of the present invention.

Reference is made to FIG. 1 schematically illustrating a data flow according to a first embodiment of the present invention.

The invention as disclosed herein utilizes determination of location, which typically is carried out by a gps (global positioning system), preferably positioned in the vehicle for which a location is to be determined. Further, passing a geofence e.g. entering or exiting a geofence is typically determined by comparing the gps position of the vehicle and comparing this with the location of the geofence; e.g. entering a geofence is said to occur when the gps location of the vehicle is inside the geofence, similarly, exit of the geofence is said to occur when the gps location of the vehicle is outside the geofence.

In the first embodiment, the present invention relates to a method for retrieving data 20, such as telematics data, from a vehicle 1, to which a tour is assigned, and forwarding at least a subset 21 of those data to an observer. No data is retrieved when no tour is assigned to said vehicle.

The method comprises the steps of:
determining a location 5, 6, 7, 8, 9, 10 of the vehicle 1,
providing two concentric geofences 2, the concentric geofences 2 comprises an outer geofence 3 and an inner geofence 4,
define a start concentric geofence 11 with a pick-up location inside an inner geofence and an end geofence 12 with a delivery location inside an inner geofence;
after a tour is assigned to said vehicle, retrieve at a server the data 20 from the vehicle 1,
forwarding from the server a subset 21 of the data to the observer, where the subset 21 is defined as data retrieved from the vehicle being within a geographical region defined as where the vehicle enters an outer 3 geofence of the start concentric geofence 11 and exit of an inner geofence of an end concentric geofence 12.

It is noted, that the geofences typically is set-up before e.g. location determination is performed. Further, while preferred embodiments of the invention comprises retrieving data from the vehicle after a tour is assigned, other embodiments may include data retrieval during other timeframes, such as during a timeframe including time before a tour is assigned and/or after the tour is completed.

FIG. 1 schematically illustrates a vehicle 1 driving along a path, with different locations 5, 6, 7, 8, 9 or 10. Two concentric geofences 2 are provided: a start concentric geofence 11 and an end geofence 12. The start concentric geofence 11 defines a pick-up location inside an inner geofence and an end geofence 12 with a delivery location inside an inner geofence.

When the vehicle has no tour assigned, (corresponding to location 5 on FIG. 1) no data is retrieved at the server. After a tour is assigned (location 6 in FIG. 1). to the vehicle, data 20 is retrieved at a server from the vehicle 1.

When the vehicle is within a geographical region defined as where the vehicle enters an outer 3 geofence of the start concentric geofence 11 and exit of an inner geofence of an end concentric geofence 12, a subset of data 21 is forwarded to the observer, where the subset 21 of data is defined as data retrieved from the vehicle.

In the illustrative example in FIG. 1, when the vehicle has made its pickup (location 9 In FIG. 1) in the inner geofence 4 of the start concentric geofence 11 it then exit the outer geofence 3 of the start concentric geofence 11 and drives towards the end concentric geofence 12. In another embodiment, (not illustrated in FIG. 1) additional pickups (intermediate concentric geofences, such intermediate concentric geofence 13 of FIG. 3) may be arranged between start concentric 11 and the end 12 concentric geofence, said additional geofences may be seen as intermediate pickups and/or drop offs between start concentric geofence 11 and end concentric geofence 12.

When the vehicle has exit an inner geofence 4 of the end 12 concentric geofence, no subset 21 of the data is forwarded to the observer.

When the vehicle has completed the tour (location 8 FIG. 1) no data 20 is retrieved to the server from the vehicle 1.

In another embodiment, the method may further comprise the step of processing the subset 21 of data, when the vehicle being within a geographical region defined as where the vehicle enters an outer 3 geofence of the start concentric geofence 11 and exit of an inner geofence of an end concentric geofence 12.

In yet another embedment, the method may further comprise the step of determining whether the vehicle has entered and exited the inner geofence 4 of the start concentric geofence 11 and whether the vehicle has entered and exited the inner geofence 4 of the end concentric geofences 12, and in confirmative case assign the tour to be completed.

The data 20 may be in the form of telematics data; the telematics data being retrieved via one or more data retrieving devices arranged on the vehicle 1.

In another embodiment of the present invention, the tour may be initiated by the vehicle entering any one of the outer geofence of the concentric geofences 2 defined by the method. It is not necessarily the "closest" concentric geofence to the vehicle, which may trigger the tour to be initiated and start forward a subset 21 of the data to the observer. The first outer geofence of the concentric geofence 2 which the vehicle enters in the time frame, initiates a forward of the subset of data. The tour may comprise multiple stops (intermediate concentric geofences). The tour may be completed when the vehicle enters and exit all of the outer geofences of all the concentric geofences 2 in the tour.

A subset 21 of data is forwarded to the observer when the vehicle has entered the outer geofence of a concentric geofence.

When the vehicle has exit the inner geofence of the end concentric geofence stop forwarding of a subset of data to the observer.

The method may further comprise a time frame, which ensures that a subset of the retrieved data only can be forwarded to the observer during this timeframe. In another aspect, the timeframe may also be used to limit or completely reject the possibility of retrieving data from the vehicle. The time frame may also be used to ensure that the vehicle completes the tour within the time frame.

If the stop of forwarding of data is initiated on the basis of a time frame, it is because the method have not registered if the tour is completed or not within the limits of that time frame.

Figure 2:
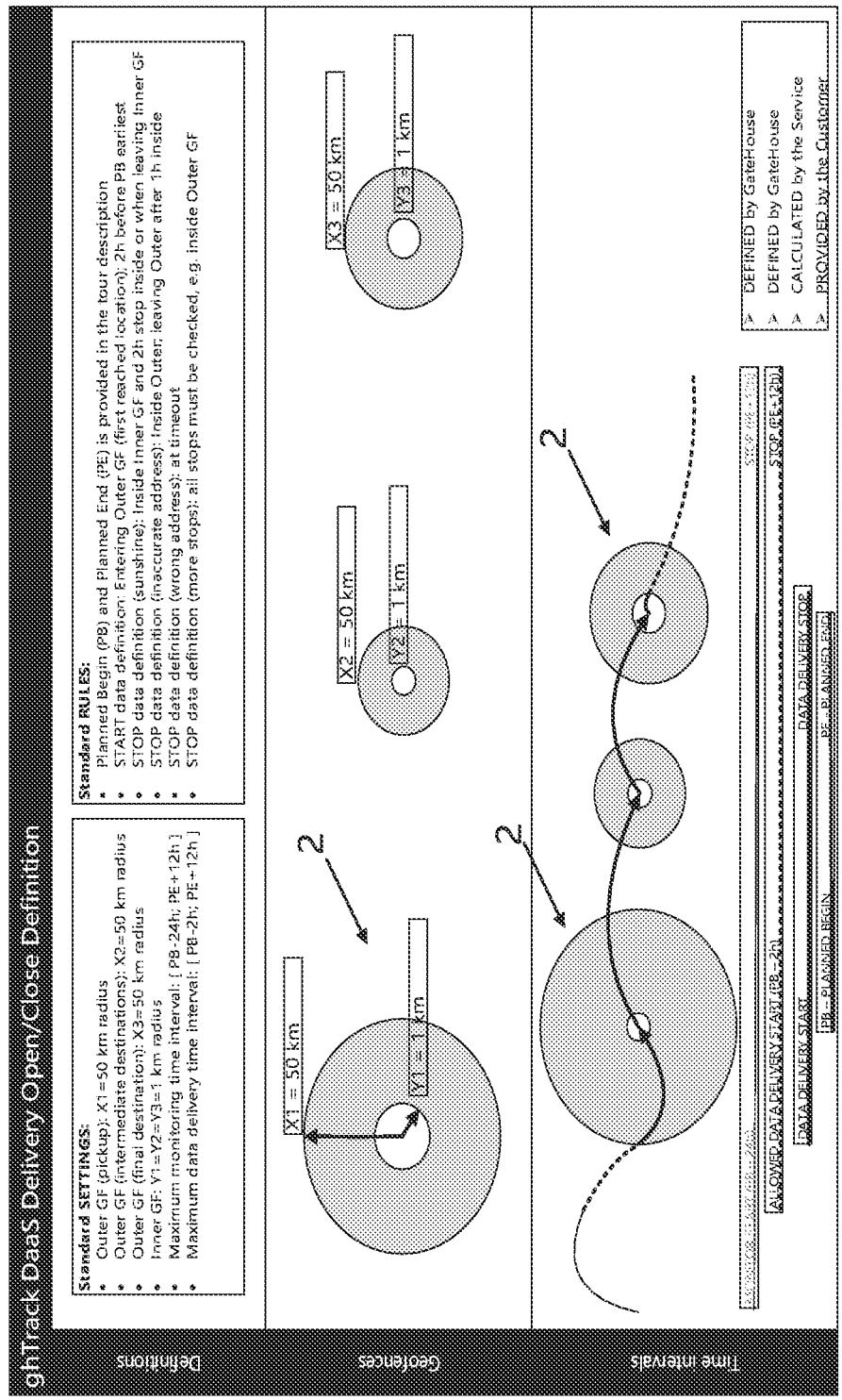
FIG. 2 is a schematically view of a retrieving and forwarding flow of as subset of data according to an embodiment of the present invention.

Reference is now made to FIG. 2, schematically illustrating retrieving and forwarding of as subset of data according to an embodiment of the present invention.

In a preferred embodiment of the present invention, the concentric geofences, comprises an inner geofence having a radius smaller than the outer geofence.

In another embodiment of the present invention, the outer geofence 3 has a radius from 0-100 km, such as 0-50 km, preferably 0-25 km.

The inner geofence 4 may have a radius from 0-20 km, such as 0-10 km, preferably 0-1 km.

In another embodiment (not shown in the figures), a shape of the geofences is selected from the group comprising: circle, polygon, such as polygenic.

The method may further comprise the step of determining whether said inner geofence 4 of the start concentric geofence 11 and the outer geofence 3 of the end concentric geofence 12 overlap, and in confirmative case initiate a dynamic adaption of the shape of the start concentric geofence 11 and/or the end concentric geofence 12. This example is schematically illustrated in FIG. 7.a schematically illustrating an example where initially set geofences overlap. As illustrated in FIG. 7.a the outer end geofence 12 overlaps the start concentric geofences (both inner 11 and outer 12 geofences) and vice versa.

The method may further comprise the step of determining whether said inner geofence 4 of the start concentric geofence 11 and the inner geofence 4 of the end concentric geofence 12 overlap, and in confirmative case initiate a dynamic adaption of the shape of the start concentric geofence 11 and/or the end concentric geofence 12. This example is schematically illustrated in FIG. 7.*b*

The method may further comprise the step of determining whether the outer geofence 3 of the start concentric geofence 11 and the outer geofence 3 of the end concentric geofence 12 overlap, and in confirmative case initiate a dynamic adaption of the shape of the start concentric geofence 11 and/or the end concentric geofence 12. This example is schematically illustrated in FIG. 7.*c*. As an alternative to the adaptation shown in FIG. 7.*c*, the adaption shown in FIG. 7.*b* may be application to the situation illustrated in FIG. 7.*c*

The method may further comprise the step of determining whether the outer geofence 3 of the start concentric geofence 11 and the inner geofence 4 of the end concentric geofence 12 overlap, and in confirmative case initiate a dynamic adaption of the shape of the start concentric geofence 11 and/or the end concentric geofence 12. This example is schematically illustrated in FIG. 7.*d*.

As illustrated in FIG. 7, the dynamic adaption typically involves reducing the areas spanned by the geofences in question to a size where no overlap exist or (as shown in FIG. 7.*b*) where the geofences has a common section (the vertical line in the lower part of FIG. 7.*b*) shared by the two geofences. During the dynamic adaptation, it should be assured that the inner geofences are not changed so as to not covering a pick-up and delivery position. If possible, it may be preferred to perform a dynamic adaption only on the outer geofences.

Figure 8:
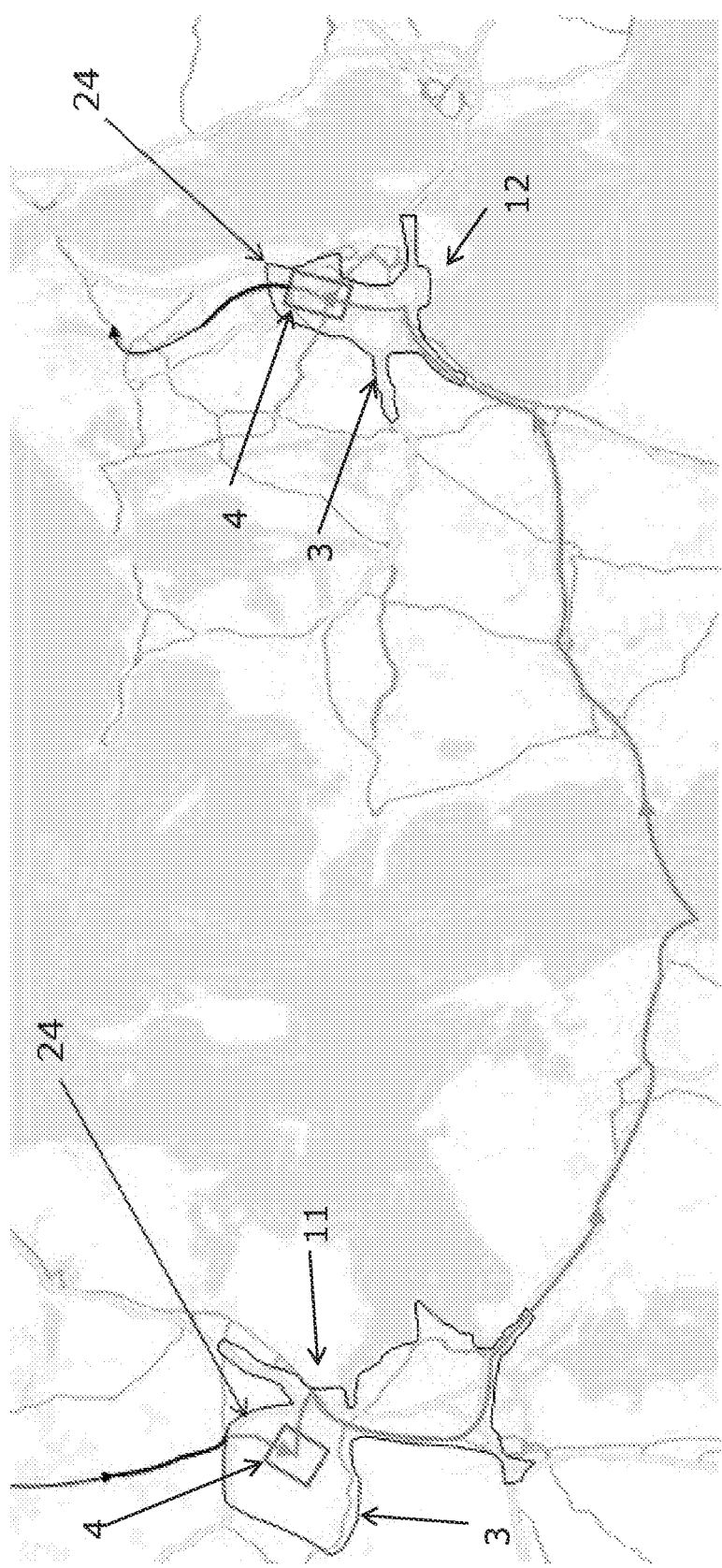
FIG. 8 is a schematically view of geofences which conforms to roads.

Referring to FIG. 8, the boundary 24 of one or more of the geofences, may in another embodiment, conform to course of roads within said tour, as schematically illustrated in FIG. 8. Such course or roads may e.g. be one or more roads encircling a part of a city.

In some instances, a vehicle travels through the geofences on a daily basis and delivers goods for different clients on different days. In order to assure that the data is transmitted correctly on the correct day as an example, the method may further comprise the step of determining whether entering and exiting geofences occurs during a predetermined period in time (or as referenced above: within a timeframe) and only forwarding subset of data if this occurrence is present during the predetermined period in time. Such a predetermined period of time may e.g. be a time period on a weekday (say Monday between 1 pm and 4 pm) and by applying such a further criteria for transmitting data, it may thereby be assured that data is not transmitted in case the vehicle travels passes the geofences on subsequent Tuesday (as an example).

Figure 9:
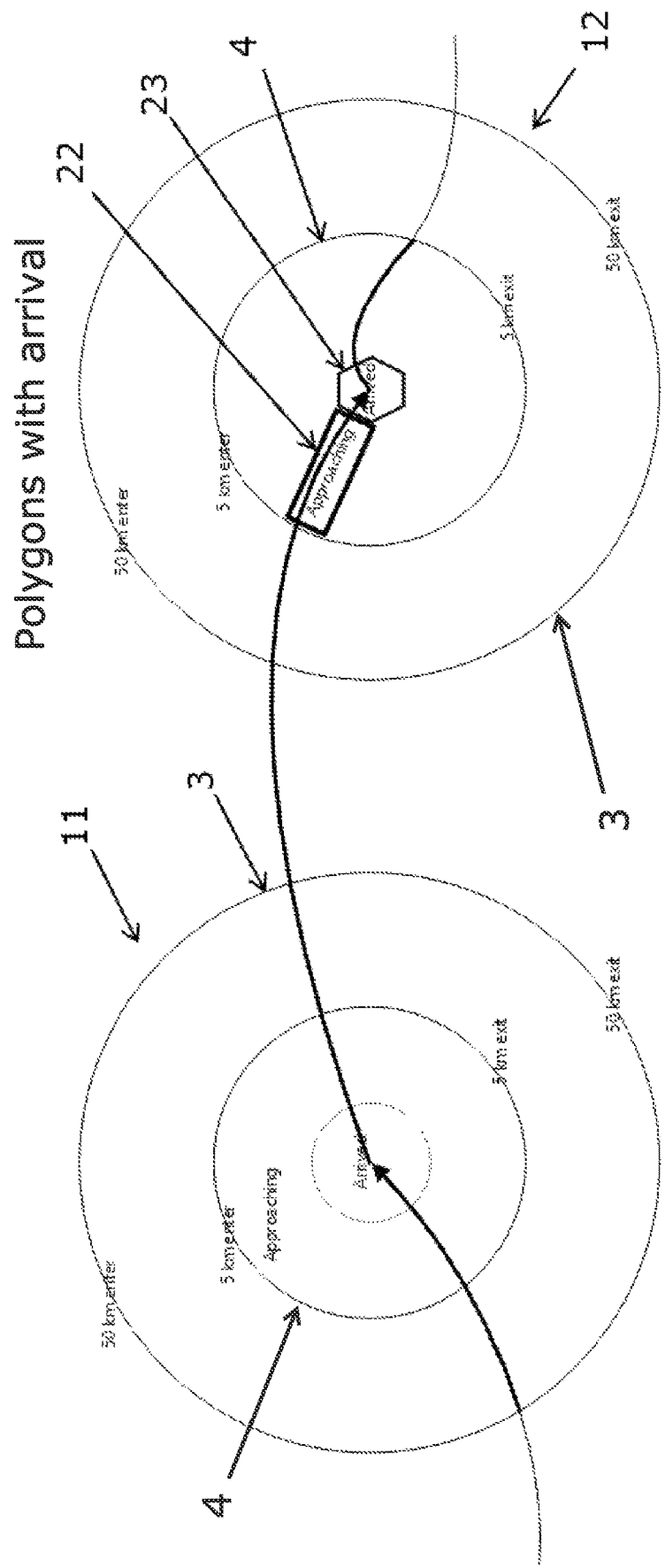
FIG. 9 is a schematically view of a concentric geofence comprising a sub-geofence, such as an arrival and/or approaching region.

In some embodiment it may also be preferred to collect and transmit information as to a vehicle approaching a delivery (or pick-up) position and as to whether the vehicle has arrived at the delivery (or pick-up) position. To this, sub-geofences are assigned inside the inner geofence as illustrated in FIG. 9. In the illustrative example in FIG. 9, the inner geofence 4 of the end concentric geofence 12 may comprise a sub-geofence 22, 23 including the delivery location, defining an approaching region and an arriving region, the method further comprising generating:

a signal indicating that a vehicle is approaching when the vehicle enters the approaching region 22;

a signal indicating that a vehicle has arrived when the vehicle enters the arrival region 23;

a signal indicating that the vehicle has departed when the vehicle leaves the arrival region.

A signal is to be understood in broad terms including data containing information on that the event has occurred. It is noted that it is also within the scope of the invention to apply only one of either approaching region or arrival region. Such a signal is typical transmitted in the same manner as other data disclosed herein.

In another embodiment of the present invention, the retrieving of data is executed maximum 24 hours before the vehicle has entered the inner geofence 4 of the start concentric geofence 11 and maximum 12 hours after the vehicle has exited 10 inner geofence 4 of the end concentric 12 geofence.

Forwarding of the subset 21 of data may be executed maximum two hours before a tour is assigned 6 to the vehicle 1 and maximum 12 hours after the vehicle has exited 10 inner geofence 4 of the end concentric 12 geofence.

The link between the time frame and concentric geofences is to ensure that the vehicle enters and/or exit the concentric geofences 2 within the time frame; so to ensure that the right vehicle is in the right location at the right time.

Figure 3:
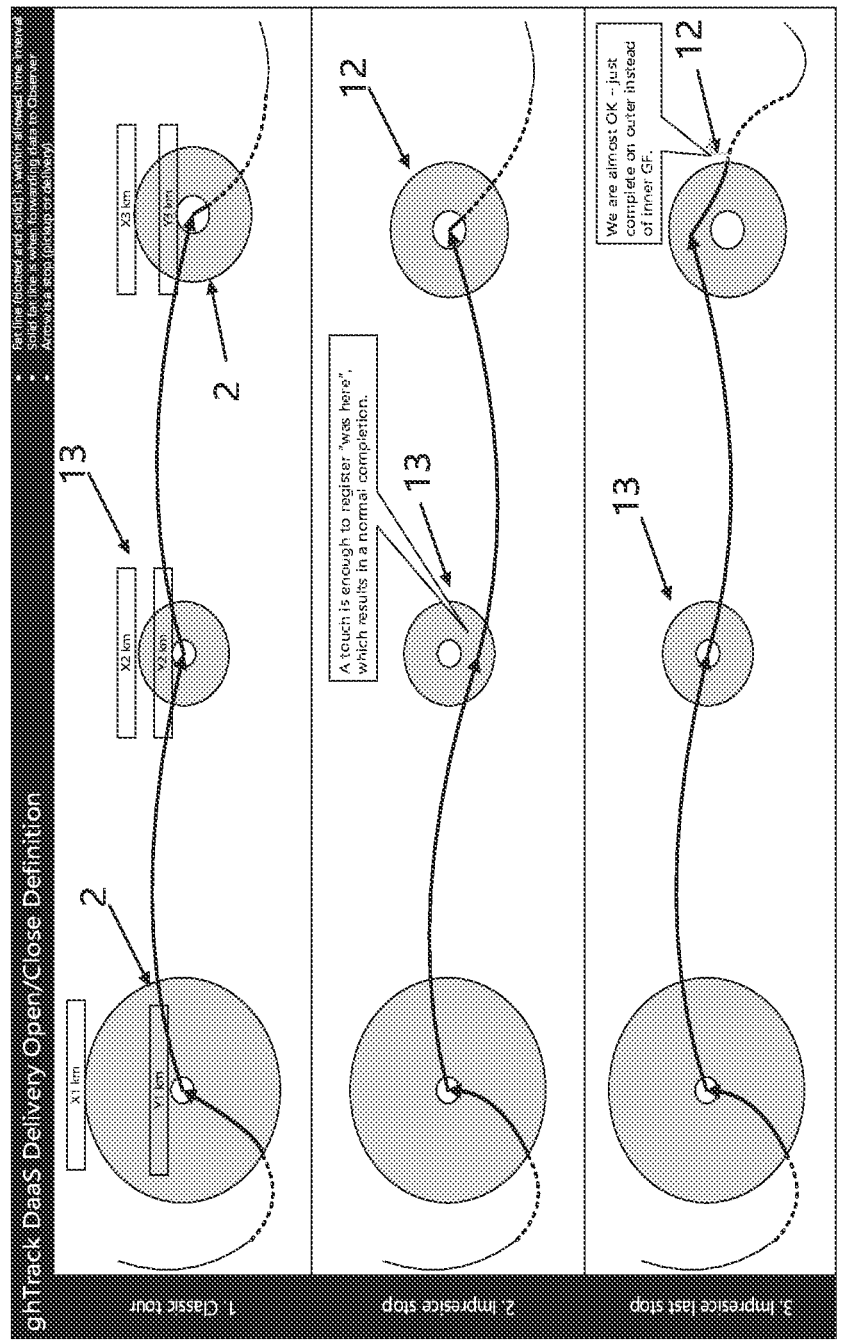
FIG. 3 is a schematically view of a retrieving and forwarding flow of as subset of data according to another embodiment of the present invention.

Reference is now made to FIG. 3, schematically illustrating retrieving and forwarding of as subset of data according to an embodiment of the present invention.

In FIG. 3, the "classic Tour" illustrates a "perfect" pickup and deliver route for a vehicle which a tour is assigned to. In the illustrative example of FIG. 3 "Classic tour" the tour is defined by three concentric geofences. When the vehicle is assigned as tour, a subset of data is retrieved from the vehicle to a server, during the time frame of the tour.

When the vehicle enters the outer geofence of the first concentric geofence, a subset of the data is forward to an observer. The subset of data is forwarded to the observer as the vehicle is on the path to the intermediate concentric geofence 13 on FIG. 3 "Classic tour" and until the vehicle has exited the outer geofence of the end concentric geofence 12. Data is retrieved by the server as long as a tour is assigned to the vehicle, being within the time frame of the tour. When the tour is competed, no data is retrieved by the server and no data is forwarded to the Observer.

In another embodiment, the method further comprises the step of determining whether the vehicle has entered and exited the inner geofence 4 of the end concentric geofences 2, and in confirmative case assign the tour to be completed.

In FIG. 3 "imprecise stop" is illustrated the step of determining whether the vehicle has entered and exited the outer geofence 3 of the start concentric geofence 11 and whether the vehicle has entered an exited an outer geofence of the intermediate concentric geofence 13 and whether the vehicle has entered and exited the inner geofence 4 of the end concentric geofences 12, and in confirmative case assign the tour to be completed.

The "imprecise stop" tour is characterized in that if the vehicle enters and exit only the outer geofence of the intermediate concentric geofence 13, it is registered as the pickup or delivering is completed.

FIG. 3 "imprecise last stop" illustrates the step of determining whether the vehicle has entered and exited the inner geofence 4 of the start concentric geofence 11 and whether the vehicle has entered and exited an inner geofence of the intermediate concentric geofence 13 and whether the vehicle has entered and exited only the outer geofence of the end concentric geofences 12, and in confirmative case assign the tour to be completed.

Figure 4:
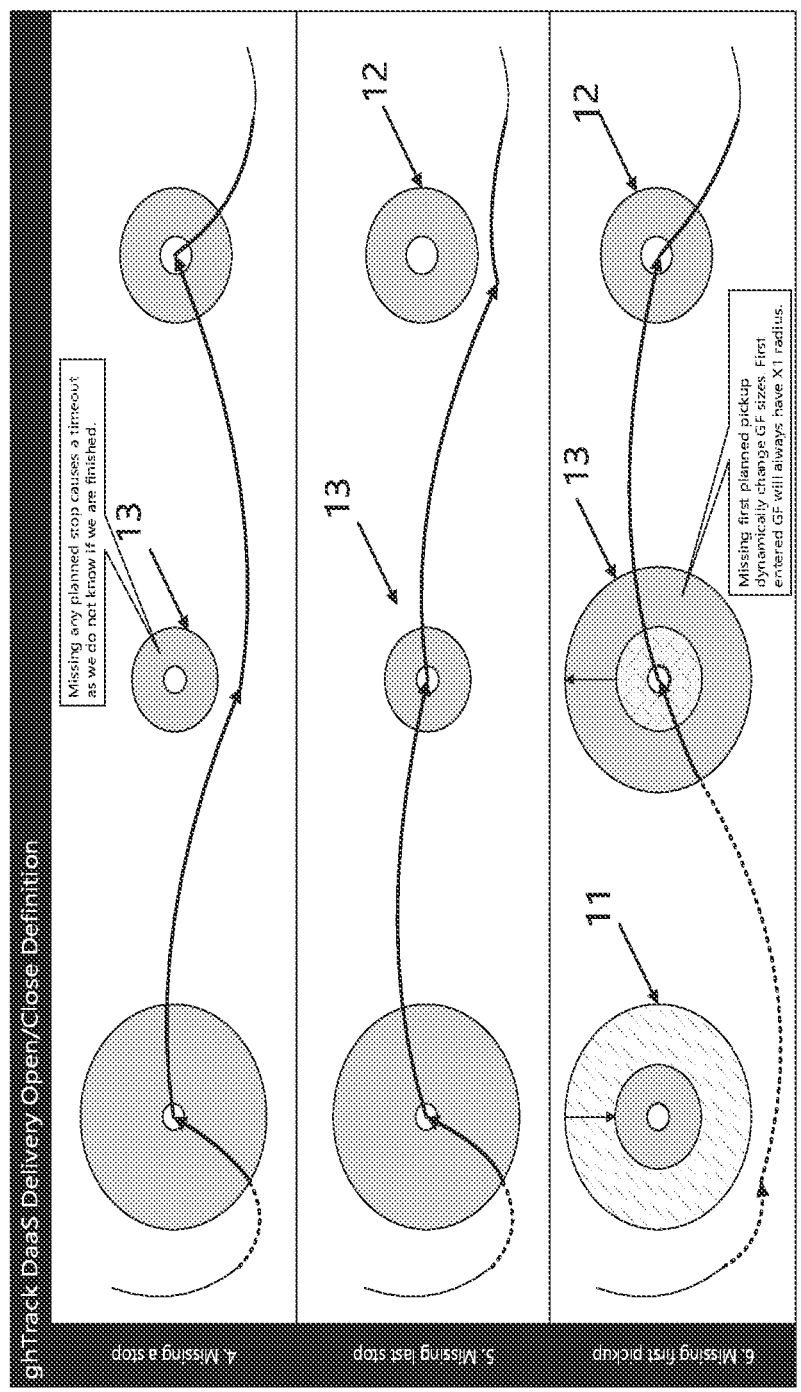
FIG. 4 is a schematically view of a retrieving and forwarding flow of as subset of data according to a third embodiment of the present invention.

Reference is now made to FIG. 4, schematically illustrating retrieving and forwarding of a subset of data according to an embodiment of the present invention.

FIG. 4 "missing a stop" illustrates the step of determining whether the vehicle has not entered and exited the outer geofence of an intermediate concentric geofence 13 and in confirmative case not assign the tour to be completed. The tour is completed within a timeframe.

FIG. 4 "missing last stop" illustrates the step of determining whether the vehicle has not entered and exited the outer geofence 3 of the end concentric geofence 12 and in confirmative case not assign the tour to be completed. The tour is completed within a timeframe.

FIG. 4 "missing first pickup" illustrates the step of determining whether the vehicle has not entered and exited the outer geofence 3 of the start concentric geofence 11 and in confirmative case change size of the end concentric geofence 12 and/or the start concentric geofence 11. The tour is completed within a timeframe.

Figure 5:
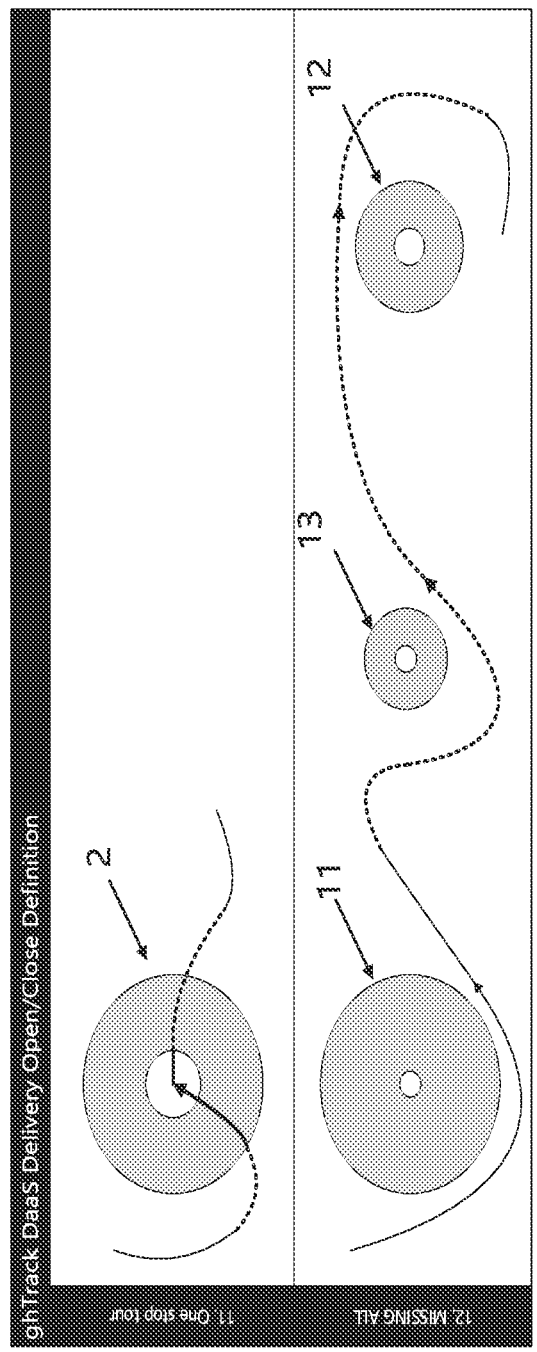
FIG. 5 is a schematically view of a retrieving and forwarding flow of as subset of data according to a fifth embodiment of the present invention.

Reference is now made to FIG. 5, schematically illustrating retrieving and forwarding of as subset of data according to an embodiment of the present invention.

FIG. 5 "one stop tour" illustrates the step of determining whether the vehicle has entered and exited a single concentric geofence 2. A subset 21 of data is forwarded to the observer from entering the concentric geofence until exiting the same concentric geofence.

FIG. 5 "MISSING ALL" illustrates the step of determining whether the vehicle has not entered the outer geofence of the start concentric geofence 11 and not entered the outer geofence of the intermediate concentric geofence 13 and not entered the outer geofence of the end 12 concentric geofence. In confirmative case not forward subset 21 of data to the observer.

Figure 6:
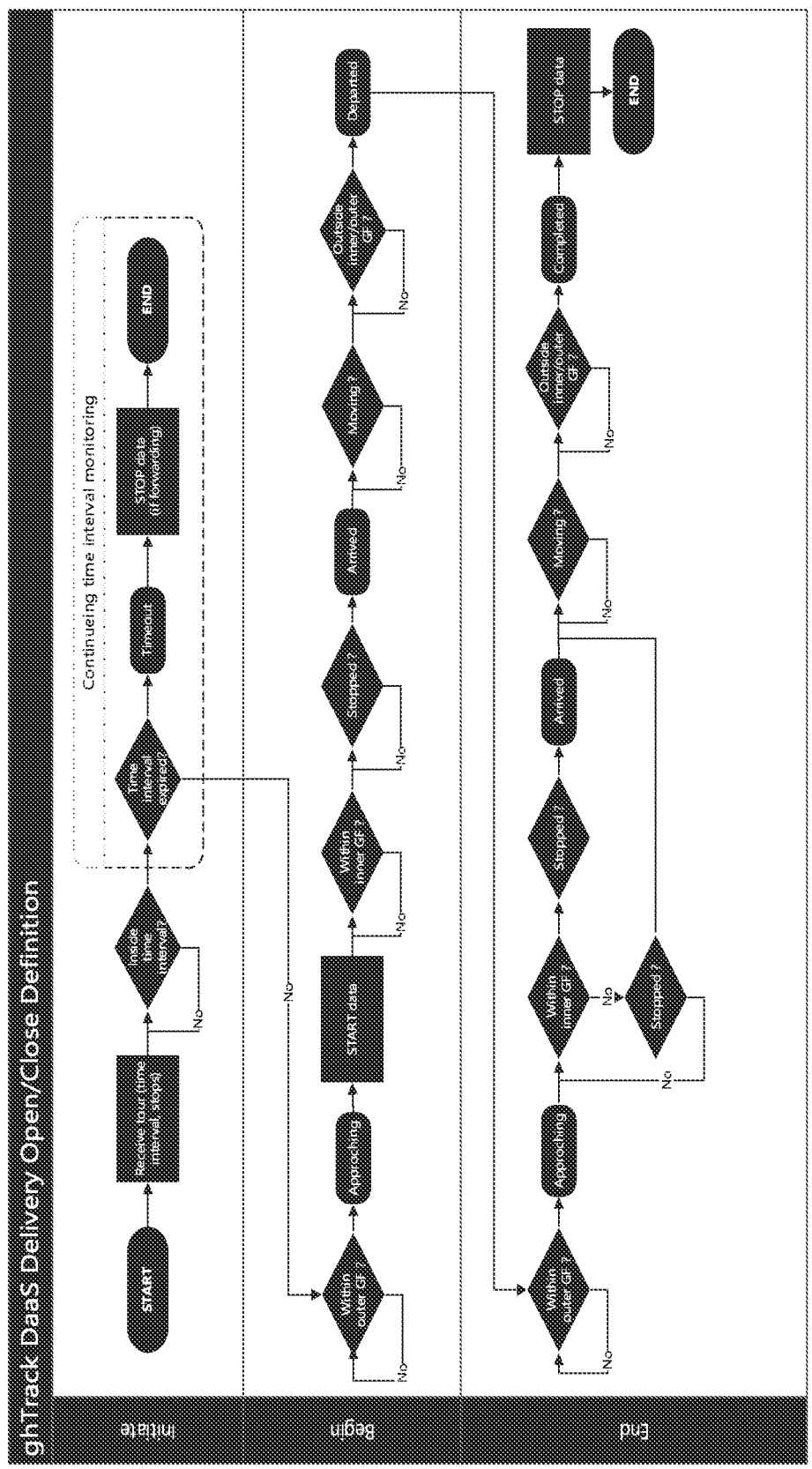
FIG. 6 is a schematically view of a flow diagram of the method according to an embodiment of the present invention.

FIG. 6 is a schematically view of the flow diagram of the method according to an embodiment of the present invention.

The row "initiate" corresponds to "initiate" on FIG. 1, schematically illustrating the sequence when the vehicle receives the tour and start retrieving data from the vehicle to a server.

When the vehicle enters the outer geofence of the start concentric geofence 11, the sequence "Begin" is initiated. The method initiates the step of forwarding a subset of the data to an observer, as long as the vehicle is between the outer geofence of the start concentric geofence and until it exits an inner geofence of the end concentric geofence.

When the vehicle has exit the inner geofence of the end concentric geofence, data is retrieved but no subset of data is forwarded to the observer. When the vehicle has completed the tour (position 8 in FIG. 1) no data is retrieved to the server.

In preferred embodiments, the vehicle has a gps and a transmitter for transmitting gps data to a central server. These data may be tagged with a identifier to uniquely identify a vehicle. This central server is configured by a software implementation to execute the various steps according to the present invention. Accordingly, the central server keeps track of the position of the vehicle and whether the vehicle has entered or exited the geofences as disclosed herein, and if the criteria for transmitting data to the observer is satisfied, the central server transmits data to the third party.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

LIST OF REFERENCES

1 Vehicle
2 Concentric geofence
3 Outer geofence
4 Inner geofence
5 Location (No tour is assigned)
6 Location (tour is assigned)
7 Location (enters outer geofence)
8 Location (no tour is assigned)
9 Location (pick up)
10 Location (exit outer geofence)
11 Start concentric geofence
12 End concentric geofence
13 Intermediate concentric geofence
20 Data
21 Subset of data
22, 23 Sub-geofence
24 Boundary
GF Geofence

The invention claimed is:

1. A method for retrieving data from a vehicle, to which a tour is assigned, and forwarding at least a subset of the data from the vehicle to an observer, the method comprising:
   determining a location of said vehicle,
   providing two or more concentric geofences, each of said concentric geofences comprising an outer geofence and an inner geofence,
   defining a start concentric geofence with a pick-up location for said assigned tour, the pick-up location being inside the inner geofence of the start concentric geofence and an end geofence with a delivery location for said assigned tour, the delivery location being inside the inner geofence of the end geofence,
   retrieving at a server the data from the vehicle during a timeframe including a time before the tour is assigned or a time after the tour is completed, or both, and
   forwarding from the server at least a subset of the data from the vehicle to the observer, wherein the at least a subset of the data from the vehicle comprises data retrieved from the vehicle within a geographical region defined as where the vehicle enters an outer geofence of the start concentric geofence and exits the inner geofence of the end concentric geofence.

2. The method according to claim 1, further comprising determining whether the vehicle has exited the inner geofence of the end concentric geofence, and if confirmed, stopping the forwarding of the at least a subset of the data from the vehicle to the observer.

3. The method according to claim 1, further comprising stopping the retrieval of the at least a subset of the data from said vehicle when said tour is completed.

4. The method according to claim 1, further comprising determining whether said vehicle has entered and exited the inner geofences of the concentric geofences.

5. The method according to claim 1, further comprising processing the at least a subset of the data from the vehicle, when the vehicle is within a geographical region defined by where the vehicle enters the outer geofence of the start concentric geofence and exits the inner geofence of the end concentric geofence.

6. The method according to claim 1, wherein the at least a subset of the data from the vehicle comprises telematics data, the telematics data being retrieved via one or more data retrieving devices arranged on the vehicle.

7. The method according to claim 1, wherein no data is retrieved when no tour is assigned to the vehicle.

8. The method according to claim 1, further comprising determining whether the vehicle has entered and exited the inner geofence of the end concentric geofences, and if confirmed, assigning the tour to be completed.

9. The method according to claim 1, further comprising determining whether the vehicle has entered and exited the outer geofence of the start concentric geofence and whether the vehicle has entered and exited the inner geofence of the end concentric geofences, and if confirmed, assigning the tour to be completed.

10. The method according to claim 1, further comprising determining whether the vehicle has entered and exited the inner geofence of the start concentric geofence and whether the vehicle has entered and exited the outer geofence of the end concentric geofences, and if confirmed, assigning the tour to be completed.

11. The method according to claim 1, further comprising determining whether the vehicle has entered and exited the inner geofence of the start concentric geofence and whether the vehicle has entered and exited the inner geofence of the end concentric geofences, and if confirmed, assigning the tour to be completed.

12. The method according to claim 1, further comprising determining whether the vehicle has not entered and exited the outer geofence of the start concentric geofence and if confirmed, not assigning the tour to be completed.

13. The method according to claim 1, further comprising determining whether the vehicle has not entered and exited the outer geofence of the end concentric geofence and if confirmed, not assigning the tour to be completed.

14. The method according to claim 1, further comprising determining whether the vehicle has not entered and exited the outer geofence of the start concentric geofence and if confirmed, changing the size of the end concentric geofence or the start concentric geofence.

15. The method according to claim 1, wherein the inner geofence that is provided has a radius smaller than the outer geofence.

16. The method according to claim 1, wherein the outer geofence that is provided has a radius from 0-100 km.

17. The method according to claim 1, wherein the inner geofence that is provided has a radius from 0-20 km.

18. The method according to claim 1, wherein the shape of the inner or outer geofences that is provided is a circle, a polygon, or polygenic.

19. The method according to claim 18, further comprising determining whether the inner geofence of the start concentric geofence and the outer geofence of the end concentric geofence overlap, and if confirmed, initiating a dynamic adaption of the shape of the start concentric geofence or the end concentric geofence.

20. The method according to claim 18, further comprising determining whether the inner geofence of the start concentric geofence and the inner geofence of the end concentric geofence overlap, and if confirmed, initiating a dynamic adaption of the shape of the start concentric geofence or the end concentric geofence.

21. The method according to claim 18, further comprising determining whether the outer geofence of the start concentric geofence and the outer geofence of the end concentric geofence overlap, and if confirmed, initiating a dynamic adaption of the shape of the start concentric geofence or the end concentric geofence.

22. The method according to claim 18, further comprising determining whether said outer geofence of the start concentric geofence and the inner geofence of the end concentric geofence overlap, and if confirmed, initiating a dynamic adaption of the shape of the start concentric geofence or the end concentric geofence.

23. The method according to claim 1, wherein the boundary of one or more of the inner or outer geofences conforms to a course of roads within the tour.

24. The method according to claim 1, further comprising determining whether entering and exiting the inner or outer geofences occurs during a predetermined period in time and only forwarding a subset of the data from the vehicle if this occurrence is present during the predetermined period in time.

25. The method according to claim 1, wherein the inner geofence of the end concentric geofence comprises a sub-geofence including the delivery location, defining an approaching region and an arriving region, the method further comprising generating:
   a signal indicating that the vehicle is approaching when the vehicle enters the approaching region;
   a signal indicating that the vehicle has arrived when the vehicle enters the arrival region; and
   a signal indicating that the vehicle has departed when the vehicle leaves the arrival region.

26. A method for retrieving data from a vehicle, to which a tour is assigned, and forwarding at least a subset of those data from the vehicle to an observer, the method comprising:
   determining a location of said vehicle,
   providing two or more concentric geofences, each of the concentric geofences comprising an outer geofence and an inner geofence,
   defining a start concentric geofence with a pick-up location inside the inner geofence of the start concentric geofence and an end geofence with a delivery location inside the inner geofence of the end geofence,
   retrieving at a server the data from the vehicle only when a tour is assigned to the vehicle, and
   forwarding from the server the at least a subset of the data received by the server from the vehicle to the observer, wherein the at least a subset of the data from the vehicle comprises data retrieved from the vehicle within a geographical region defined as where the vehicle enters an outer geofence of the start concentric geofence and exits the inner geofence of the end concentric geofence.

27. A method for retrieving data from a vehicle, to which a tour is assigned, and forwarding at least a subset of those data from the vehicle to an observer, the method comprising:
   determining a location of said vehicle,
   providing two or more concentric geofences, each of said concentric geofences comprising an outer geofence and an inner geofence,
   defining a start concentric geofence with a pick-up location for said assigned tour, the pick-up location being inside the inner geofence of the start of the concentric geofence and an end geofence with a delivery location for said assigned tour, the delivery location being inside the inner geofence of the end geofence, retrieving at a server the at least subset of the data from said the vehicle during a timeframe beginning when a tour is assigned to the vehicle and ending when the tour is completed, forwarding from the server the at least a subset of the data received by the server from the vehicle to the observer, wherein the at least a subset of the data from the vehicle comprises data retrieved from the vehicle within a geographical region defined as where the vehicle enters an outer geofence of said start concentric geofence and of exits the inner geofence of the end concentric geofence.

* * * * *